INVENTOR.
DENNIS L. HOGAN
BY
*Ronald T. Reiling*
ATTORNEY

INVENTOR.
DENNIS L. HOGAN
BY
*Ronald T. Reiling*
ATTORNEY

May 21, 1968     D. L. HOGAN     3,384,870
CONTROL APPARATUS

Filed Sept. 17, 1965     10 Sheets-Sheet 7

INVENTOR.
DENNIS L. HOGAN
BY
Ronald T. Reiling
ATTORNEY

FIG. 8

May 21, 1968  D. L. HOGAN  3,384,870
CONTROL APPARATUS

Filed Sept. 17, 1965  10 Sheets-Sheet 10

INVENTOR.
DENNIS L. HOGAN
BY
Ronald T. Reiling
ATTORNEY

United States Patent Office 3,384,870
Patented May 21, 1968

3,384,870
CONTROL APPARATUS
Dennis L. Hogan, Largo, Fla., assignor to Honeywell Inc., Minneapolis, Minn., a corporation of Delaware
Filed Sept. 17, 1965, Ser. No. 488,127
14 Claims. (Cl. 340—37)

ABSTRACT OF THE DISCLOSURE

A modular digital intersection traffic controller is illustrated wherein each module controls one function and control of the intersection is transferred to other modules at the end of the timing interval of a particular module's function.

Background of the invention

This invention pertains to control apparatus and more particularly to apparatus used to control traffic signals.

In the past various types of devices have been used to control the energization of traffic signal lights. Most of these devices were electro-mechanical systems in which a motor driven cam unit or a plurality of stepping switches were used to control the energization of appropriate relays to provide energization of the traffic signal lights. These electro-mechanical arrangements have numerous disadvantages. One of the main disadvantages is that the electro-mechanical controller is generally constructed as a unit so that, if it is desired to change the function at the intersection, the entire unit must be replaced. Thus, it may be necessary to replace the entire intersection controller to add or subtract one minor function performed by the controller. For example, if a particular intersection is organized such that a pedestrain walk signal is provided each time a right-of-way signal is provided on the parallel movement and it is desired to change the intersection to one in which the pedestrian walk signal is displayed only when a pedestrian pushes a button, it may well be necessary to change the entire intersection controller.

Another disadvantage of the electro-mechanical intersection controllers is that they require an undue amount of maintenance. Mechanical wear and relay contact burn require frequent maintenance to prevent erroneous operation of the controller.

A third disadvantage of electro-mechanical intersection controllers is that when the components wear an excessive amount, the relative timing of the intersection may change. Small amounts of mechanical wear may be additive from cycle to cycle so that after the intersection controller has been operating for some length of time the relative timing from intersection to intersection changes. Thus, when the signals for a series of intersections are supposed to operate sequentially, differing amounts of wear in the controllers will result in faulty sequencing.

Various attempts have been made to develop electronic controllers and thereby alleviate some of the disadvantages of the electro-mechanical controllers. While electronic controllers have solved some of the problems related to electro-mechanical controllers, other problems remain and new problems have appeared. Generally, the electronic controllers have been analog devices in which signal levels must be precisely controlled to prevent deviation in the timing cycle. When precise control of the signal level is required, the unit becomes more expensive and less reliable. Furthermore, the electronic controllers generally retain the disadvantage of unit construction.

Summary of the invention

The applicant's invention is a considerable advance in the state of the art and overcomes the many problems and disadvantages of the prior art electronic controllers, such as G. D. Hendricks et al., 3,072,883. More specifically, the applicant's invention provides a significant reduction over Hendricks et al. in size, weight, and power required. More importantly, the applicant's invention is considerably less expensive than the Hendricks et al. controller. The applicant's controller has been carefully designed to utilize integrated circuitry and to eliminte the inherent disadvantages of saturable elements such as those utilized by Hendricks et al. The bias and control currents of the saturable logic elements of the Hendricks et al. controller must be closely controlled and require a bias control adjustment on each saturable element. The applicant's design utilizes digital logic in which signals are either ON or OFF so that changes in signal level do not result in erroneous operation. Consequently, the applicant's invention does not require any adjustments.

Precision timing is extremely important and desirable in any traffic controller. The timing function is particularly critical in coordinated traffic control wherein slight inaccuracies in timing disrupt the progression rates. The inaccuracies of the saturable element timing arrangement of Hendricks et al. are eliminated in the applicant's invention by utilizing digital timing techniques. Of course, the applcant's invention has no moving parts, requires little or no maintenance and obtains ultra high reliability.

Another feature of this invention is the precise timing attained by the use of digital timing. The power line voltage frequency is used as a reference and frequency divided by counters to provide long term timing stability heretofore unattainable by prior art timing schemes.

A further advantage of this invention is the modular construction of the intersection controller so that each intersection controller can be built from one or more modules with each of the modules providing a specific function or phase. Thus, the operation of a particular intersection controller may be changed by the addition of a module, the removal of a module, or the substitution of one module for another.

In the applicant's intersection controller, each module provides a timing function for one traffic movement.

When a module completes its timing function, it provides an output signal signifying the completion of its timing function. This output signal is connected to another module which then starts timing its function. Relative timing is maintained by a centralized clock which controls the overall timing of the intersection controller.

The objects and advantages of this invention will become apparent to those skilled in the art upon a reading of the following specification and claims in conjunction with accompanying drawings.

Brief description of the drawings

FIGURE 8 is a block diagram and schematic illustration of a pedestrian insert on a demand module.

*Description of the preferred embodiments*

It is to be understood that while specific circuit diagrams are shown herein, various modifications will be obvious to those skilled in the art. For example, a flip-flop normally has two inputs and two outputs with the outputs being maintained in opposite logic states. However, either logic state is a useful signal and depending upon the circuit design may be considered an ON or OFF signal.

Figure 1:
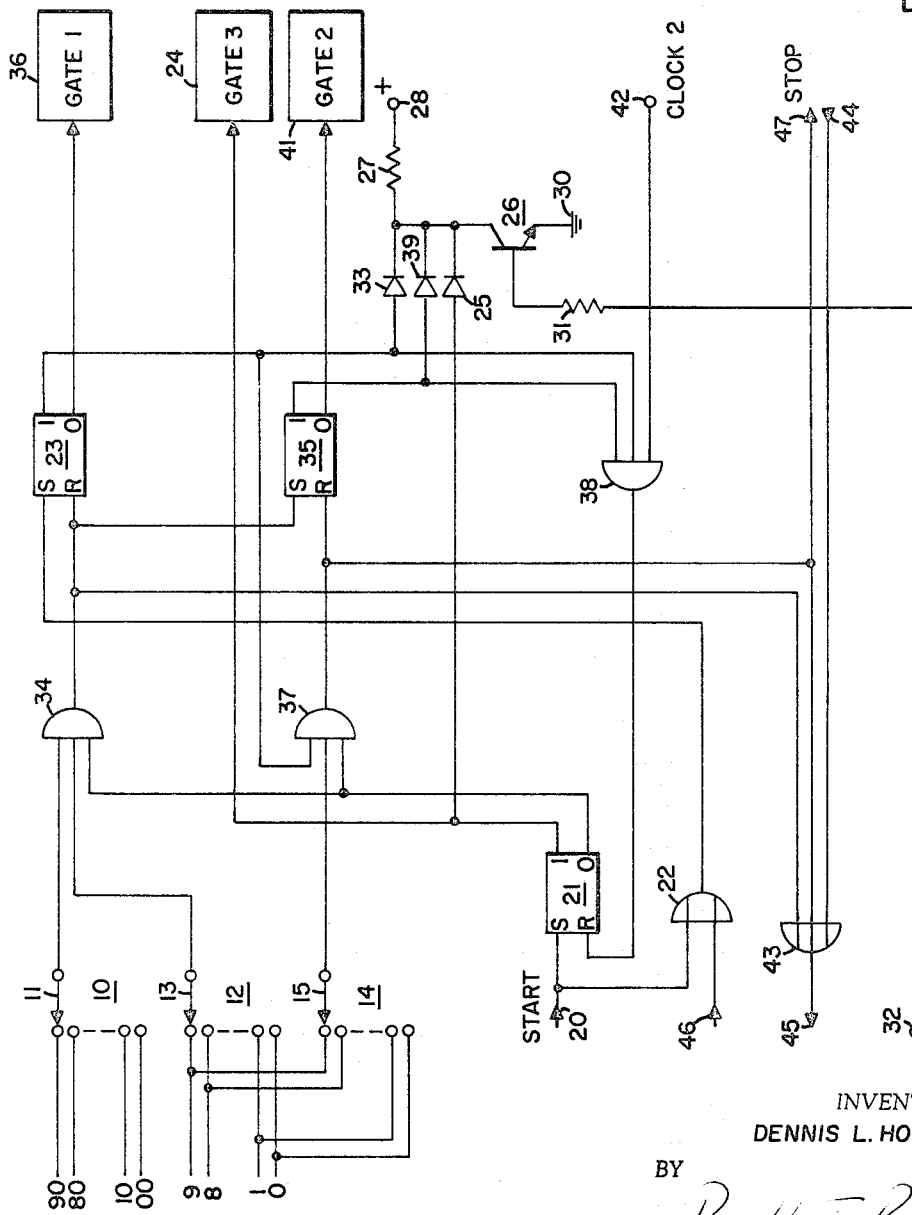
FIGURE 1 is a block diagram and schematic illustration of a two-interval pretimed module.

Referring now to FIGURE 1, there is shown a first multi-position switch 10 having ten input lines labeled 00 to 90 and further having a variable contact 11, a second multiposition switch 12 having ten input lines labeled 0 to 9 and further having a variable contact 13, and a third multiposition switch 14 connected in parallel with switch 12. Switch 14 has a variable contact 15. The input lines to switches 10, 12 and 14 are adapted to be connected to a counter, timing means, or clock. The 0–9 lines are sequentially pulsed with one second pulses. For example, the 0–9 lines may be connected to the various stages of a ring counter which is pulsed once every second. The 00–99 lines are adapted to be connected to a counter, timing means, or clock which provides sequential ten second pulses. Thus, by proper combination of the output signals from the variable contacts 11, 13, and 15, any time delay from 0 to 99 seconds may be obtained.

An input terminal 20 labeled START is connected to a set input of a bistable means, bistable element, or flip-flop 21 which further has a reset input, a first or 1 output, and a second or 0 output. Input terminal 20 is further connected through a gate means, in this case an OR gate 22, to a set input of a bistable means, bistable element, or flip-flop 23 which further has a reset input, a first or 1 output, and a second or 0 output. The 1 output of flip-flop 21 is connected to a first load means or signal means shown as a block 24 labeled GATE 3. Block 24 may be, for example, a red signal light energized by a relay in response to signals from flip-flop 21. However, as it is desired to eliminate all moving parts and relay contacts, it is preferred that block 24 include a signal light and a solid state signal relay power unit generally constructed from silicon control rectifiers. The power unit is adapted to be connected to provide power to the signal light in response to a signal from flip-flop 21.

The 1 output of flip-flop 21 is further connected through a diode 25 to a collector of a transistor 26. The collector of transistor 26 is further connected through a resistor 27 to a source of positive energizing potential 28. The emitter of transistor 26 is connected to a common conductor or ground 30 and the base is connected through a resistor 31 to an input terminal 32.

The 0 output of flip-flop 23 is connected to a block 36 labeled GATE 1 which is similar to block 24. The 1 output of flip-flop 23 is connected through a diode 33 to the collector of transistor 26.

A gate means or AND gate 34 has a first input connected to contact 11 of switch 10, a second input connected to contact 13 of switch 12, a third input connected to the 0 output of flip-flop 21, and an output connected to the reset input of flip-flop 23 and further connected to the set input of a bistable means, bistable element, or flip-flop 35 which is similar to flip-flops 21 and 23. The 0 output of flip-flop 35 is connected to a block 41 labeled GATE 2 which is similar to blocks 24 and 36. The 1 output of flip-flop 35 is connected through a diode 39 to the collector of transistor 26.

A gate means or AND gate 37 has a first input connected to contact 15 of switch 14, a second input connected to the 1 output of flip-flop 23, a third input connected to the 0 output of flip-flop 21, and an output connected the reset input of flip-flop 35. A gate means or AND gate 38 has a first input connected to the 1 output of flip-flop 35, a second input connected to the 1 output of flip-flop 23, and a third input connected to an input terminal 42 which is labeled CLOCK 2. AND gate 38 has an output connected to the reset input of flip-flop 21.

A gate means or OR gate 43 has a first input connected to the output of AND gate 34, a second input connected to the output of AND gate 37, a third input connected to an input terminal 44, and an output connected to an output terminal 45. An input terminal 46 is connected to a second input of OR gate 22. The output of AND gate 37 is connected to an output terminal 47 labeled STOP.

The module shown in FIGURE 1 basically times out two fixed time periods each of a predetermined or preset interval. This module could be used to control one traffic movement of a simple fixed time intersection or could be used to provide a left turn signal or any similar function. One or more other modules may be connected in a chain with this module to build a complete intersection controller. The modules are interconnected and arranged in a chain so that the stop output signal from one module provides the start input signal for the subsequent module.

To understand the operation of FIGURE 1, assume that the counter or timer has been reset to 0 so that the 0 lines are energized and that flip-flops 21, 23 and 35 are all reset. When flip-flop 21 is reset, the 1 output energizes gate 3 which, for example, provides a red signal light. Flip-flops 23 and 35 do not energize gates 1 and 2 when they are reset. A start pulse is provided at terminal 20 from the stop output of the preceding module in the chain. This start pulse sets flip-flops 21 and 23. When flip-flop 21 is set, gate 3 is unenergized or inhibited thereby removing the red light. When flip-flop 23 is set, gate 1 is energized to display a right-of-way signal or green signal light. Variable contact 11 of switch 10 and variable contact 13 of switch 12 may be set in any desired position to provide any predetermined time delay desired. In the position shown in FIGURE 1 the time delay is 99 seconds. Once the counter reaches 99, all three terminals of AND gate 34 will be energized so that an output pulse is provided to the reset input of flip-flop 23 thereby removing the energization of gate 1. The same pulse from AND gate 34 sets flip-flop 35 and provides an output pulse at output terminal 45. When flip-flop 35 is set, gate 2 is energized. Gate 2 may be a yellow or clearance light. The signal at output terminal 45 is connected to a reset input on the counter which resets the counter to 0.

The counter now counts for 9 seconds at which time switch 14 provides an output signal to AND gate 37 which then provides a signal to the reset input of flip-flop 35. When flip-flop 35 is reset, gate 2 is unenergized. The 1 outputs of flip-flops 23 and 35 energize two terminals of AND gate 38 and the third terminal is energized by a clock pulse from input terminal 42 whereby an output pulse from AND gate 38 resets flip-flop 21 so that the red light is displayed by gate 3.

Clock 2 is used for synchronizing the operation of the modules. It provides a pulse of .1 second duration every second. It should be noted that if it is desired to have more than a 9 second yellow interval, all that is necessary is to substitute a four input AND gate for gate 37 and to connect another multi-position switch in parallel with switch 10 with the variable contact of this switch being connected to the fourth terminal of the substituted AND gate. AND gate 37 also provides a pulse at terminal 45 to reset the counter and at the stop output terminal 47 which is connected to the start input of the module controlling another movement.

If a signal is provided at input terminal 32 to switch transistor 26 ON, the cathodes of diodes 25, 33, and 39 are grounded through transistor 26 thereby grounding the 1 outputs of each of the flip-flops. When the 1 output of each of the flip-flops is grounded, they are all reset.

Input terminal 46 is connected through OR gate 22 to the set input of flip-flop 23 so that a signal applied to input terminal 46 will cause gate 1 to be energized thereby providing a green light. The output terminal 45 is connected to the input terminal 44 of the subsequent module so that only one connection has to be made to the reset of the counter. This is merely a design detail and tends to lessen the total circuitry and simplify the connections.

Figure 2:
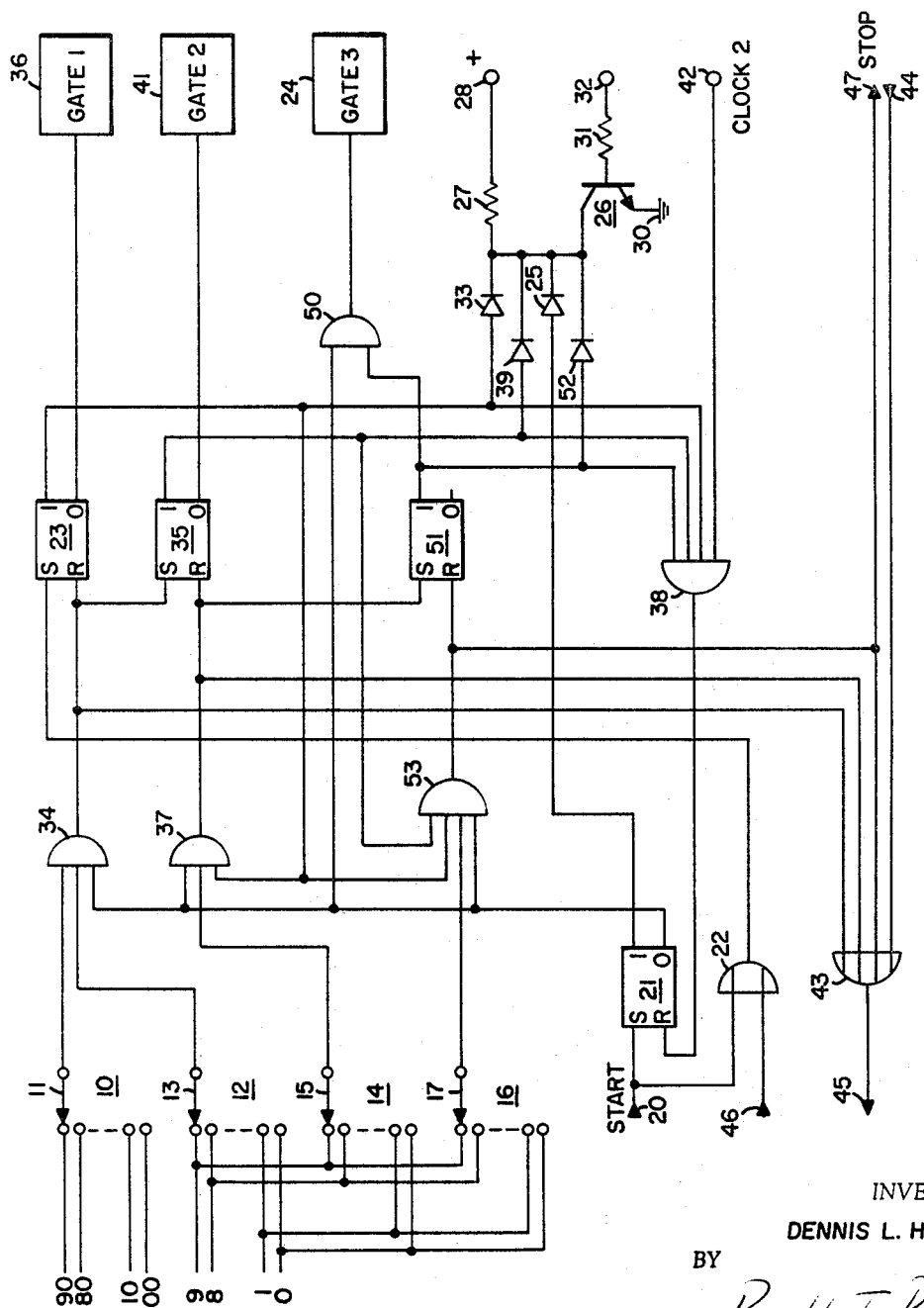
FIGURE 2 is a block diagram and schematic illustration of a three-interval pretimed module.

FIGURE 2 shows a three-interval pretimed module in which the third interval is a timed all red interval for additional clearance, for example, in a large intersection. This additional interval could also be used for pedestrian clearance or an advanced left turn.

FIGURE 2 is connected much the same as FIGURE 1 and the same numbers have been used. The differences are that instead of the 1 output of flip-flop 21 being connected to block 24, the 0 output of flip-flop 21 is connected to one terminal of a gate 50 the output of which is connected to block 24. The output of AND gate 37 is further connected to the set input of a bistable means, bistable element, or flip-flop 51 which is similar to flip-flops 21, 23 and 35. The 1 output of flip-flop 51 is connected through a diode 52 to the collector of transistor 26.

A switch 16 with a variable contact 17 is connected in parallel with switch 12 in a manner similar to the connection of switch 14. Contact 17 is connected to one input of a gate means or AND gate 53. AND gate 53 has a second input connected to the 1 output of flip-flop 35, a third input connected to the 1 output of flip-flop 23, a fourth input connected to the 0 output of flip-flop 21, and an output connected to the reset input of flip-flop 51. The 1 output of flip-flop 51 is connected to a second input of gate 50 and is further connected to a fourth input of gate 38. A fourth input is added to gate 43 which is connected to the output of gate 53. The stop output terminal 47 is no longer connected to gate 37 but is connected to gate 53 whereby a stop signal is provided only when all three intervals have been timed out.

The operation of FIGURE 2 is essentially the same as that of FIGURE 1, however, after the output signal from gate 37 is transmitted through gate 43 to reset the clock, the clock begins cycling until contact 17 of switch 16 is energized thereby energizing the fourth input terminal of AND gate 53 which provides an output signal to reset flip-flop 51, reset the counter, and provide a signal at the stop output terminal 47. Flip-flop 21 is not reset by a pulse from gate 38 until after flip-flop 51 is reset and the fourth input terminal of gate 38 is energized. Gate 50 provides an output signal whenever flip-flop 21 is reset or flip-flop 51 is set. Thus, gate 3 is energized to provide a red light after a pulse from AND gate 37 sets flip-flop 51 and remains energized when flip-flop 51 is reset because flip-flop 21 is also reset.

Figure 3:
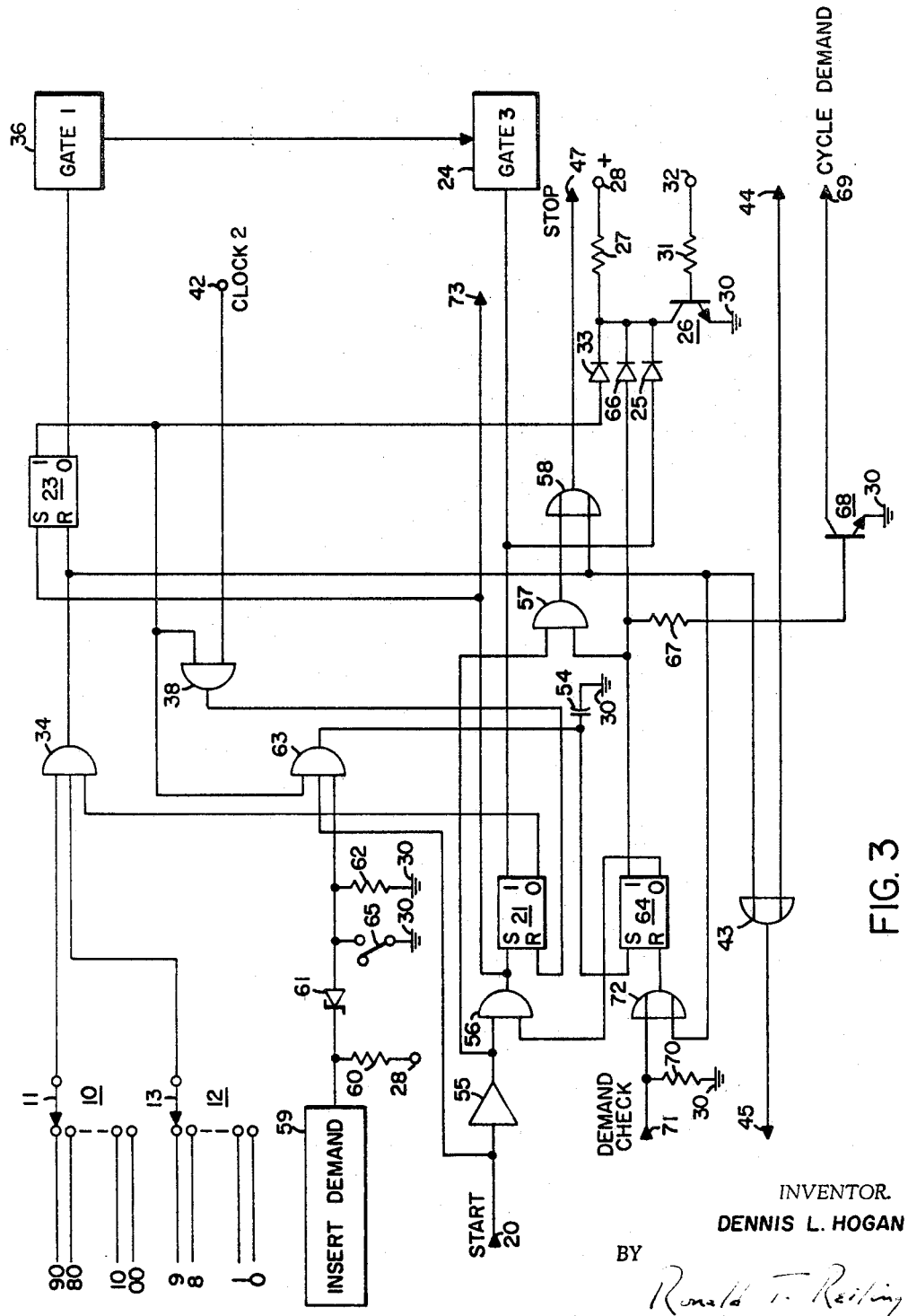
FIGURE 3 is a block diagram and schematic illustration of a one-interval pretimed insert on demand module.

The module shown in FIGURE 3 is a one-interval pretimed insert on demand module. This module provides one timed output signal variable from 0 to 99 seconds which may be used, for example, for a left turn signal or a pedestrian walk signal or in any place where it is desired to have one timed interval only when necessary. An example of the use of this module is in a left turn lane when it is desired to provide a left turn signal only when a vehicle enters the left turn lane. The vehicle would actuate a detector to provide a demand signal to this module thereby inserting this module in the traffic controller cycle.

The module in FIGURE 3 has many components similar to those of FIGURE 1. These components have the same numbers. The differences between FIGURE 3 and FIGURE 1 are that switch 14, gate 37, flip-flops 35, input terminal 46, gate 22, block 41, and the accompanying circuitry for these components in FIGURE 1 are deleted in FIGURE 3.

In FIGURE 3 there is shown an inverter 55 with an input connection to input terminal 20 and an output connected to one input of a gate means or AND gate 56 the output of which is connected to the set input of flip-flop 21. The output of inverter 55 is further connected to an input of a gate means or AND gate 57 the output of which is connected to the input of a gate means or OR gate 58. The output of OR gate 58 is connected to the stop output terminal 47.

From a block 59 labeled INSERT DEMAND there is an output connected through a resistor 60 to source 28 and further connected to one terminal of a limiting device such as a Zener diode 61 the other terminal of which is connected through a resistor 62 to ground 30 and further connected to one input of a gate means or AND gate 63. AND gate 63 has a second input connected to input terminal 20, a third input connected to the 1 output of flip-flop 23, and an output connected to a set input of a bistable means, bistable element, or flip-flop 64 which is similar to flip-flops 21 and 23. A switch 65 is connected in parallel across resistor 62 such that when switch 65 is closed the first input to gate 63 is connected to ground 30. The set input of flip-flop 64 is connected through a capacitor 54 to ground 30.

The 1 output of flip-flop 64 is connected through a diode 66 to the collector of transistor 26 and is further connected through a resistor 67 to the base of a transistor 68 the emitter of which is connected to ground 30. The collector of transistor 68 is connected to a cycle demand output terminal 69. The 1 output of flip-flop 64 is further connected to a second input of AND gate 57. The 0 output of flip-flop 64 is connected to a second input of AND gate 56.

A demand check input terminal 71 is connected through a resistor 70 to ground 30 and to one input of a gate means or OR gate 72 the output of which is connected to the reset input of flip-flop 64. The output of gate 34 is connected to a second input of gate 58 instead of being directly connected to the stop output terminal 47. The output of gate 34 is further connected to a second input terminal of OR gate 72. The output of AND gate 56 is further connected to an output terminal 73.

To understand the operation of FIGURE 3 first assume that there is no signal provided by the insert demand 59 and that all of the flip-flops are reset. When flip-flop 64 is reset, AND gate 56 is unenergized and AND gate 57 is energized. Thus, when a start pulse occurs, it will not be passed to the set input of flip-flop 21. The start pulse will be transmitted through inverter 55, AND gate 57, and OR gate 58 to the stop output 47 indicating that there is no demand on this module.

Limiting device 61 is normally operated in reverse breakdown due to the potential of source 28. When there is an input signal provided by the insert demand 59, limiting device 61 will no longer be broken down and the input of gate 63 will be grounded through resistor 62. Gate 63 is energized by the start input terminal 20 when there is no start pulse and is unenergized when there is a start pulse. Gate 63 is so connected so that when a demand is made coincident with a start pulse, two right-of-way signals will not be provided at the same time. Limiting device 61 is used merely to provide noise rejection of signals from the insert demand 59 because the insert demand 59 is a detector or actuator to detect the presence of a vehicle in the left turn lane and may provide considerable noise. The insert demand signal energizes gate 63 so that an output signal is applied to the set input of flip-flop 64. Flip-flop 64 unenergizes gate 57 so that a start pulse cannot reach the stop output and energizes gate 56 so that the start pulse will set flip-flop 21. When flip-flop 21 is set, flip-flop 23 is also set by the output from gate 56 thereby energizing gate 1 and unenergizing gate 3. Gate 1 may be a right-of-way signal such as a left turn arrow.

The counter cycles until signals are provided on contacts 11 and 13 thereby energizing gate 34 to reset flip-flop 23. The 1 output from flip-flop 23 energizes gate 28 so as to reset flip-flop 21. The output signal from gate 34 also passes through gate 58 to the stop output terminal 47, passes through gate 72 to the reset input of flip-flop 64, and passes through gate 43 to output terminal 45 to reset the counter thereby completing one cycle of operation.

Output terminal 73 receives the output signal from gate 56 when flip-flops 21 and 23 are set. Output terminal 73 may be connected to a terminal such as input terminal 46 of FIGURES 1 and 2 whereby a right-of-way signal is provided on a parallel or non-conflicting traffic movement. Output terminal 73 may or may not be used as is desired.

The demand check input terminal 71 also may or may not be used as is desired. If this terminal is used it is connected to the start pulse of the preceding module in the chain. When a pulse occurs at input 71, it is passed through OR gate 72 and attempts to reset flip-flop 64. However, if gate 63 is energized by the insert demand 59, the demand check input signal is not able to reset flip-flop 64. If the output signal from the insert demand 59 has disappeared before a start pulse occurred at start input 20, there will be no output signal from gate 63 and the demand check input signal will reset flip-flop 64 indicating that there is no longer a demand on this module. Input terminal 71 is used merely to prevent an unnecessary cycle.

The cycle demand output terminal 69 also may or may not be used as is desired. If the module shown in FIGURE 3 is used in a semi-actuated or fully actuated intersection, output terminal 69 is connected to a recall module to recall the right-of-way signal from its dwell position. Thus, when there is a demand and flip-flop 64 is set, the 1 output of flip-flop 64 will switch transistor 68 ON thereby lowering the potential of output terminal 69 indicating that a demand has been made.

Switch 65 is used to provide an automatic demand. When switch 65 is closed, such that the input of gate 63 is connected to ground 30, there is a continuous demand presented at the input of gate 63 whereby the module shown in FIGURE 3 is converted to a fixed time module always on demand.

It is also noted that the 1 output of flip-flop 23 is connected to gate 63 so that if a demand is made by the insert demand 59 while the right-of-way signal is displayed by gate 1, it does not increase the length of time that the right-of-way signal is displayed.

If the module shown in FIGURE 3 is used to display a left turn signal, it is conceivable that several vehicles would all desire a left turn signal and that not all would be able to make a left turn in the time allotted. Thus, one or more vehicles could be stopped in the left turn lane. Therefore, it is preferred that the insert demand 29 include a presence detector to detect whether or not there are vehicles present in the left turn lane so that if a vehicle does not succeed in making a left turn during one time interval, a demand is made during the next cycle.

Figure 4:
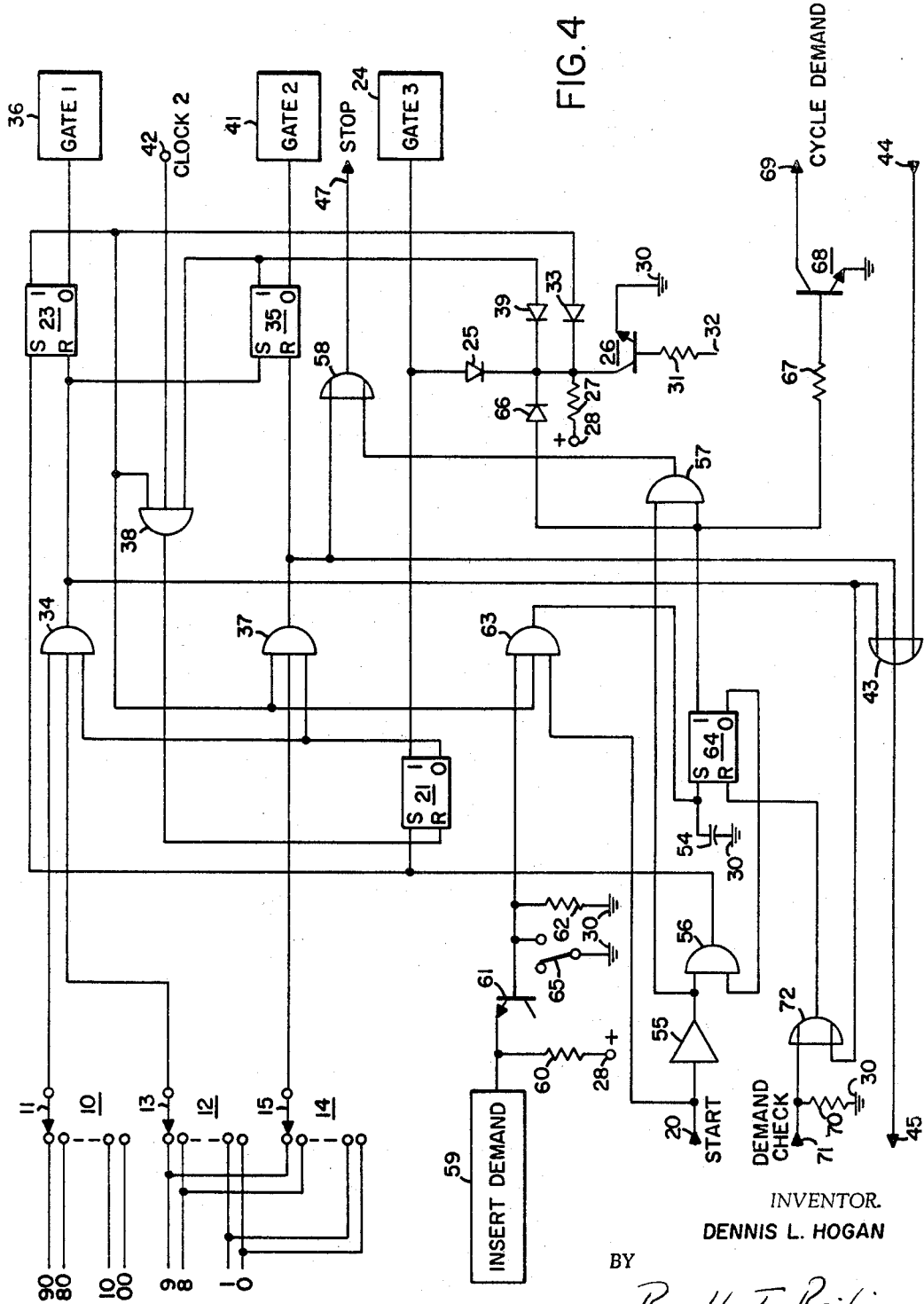
FIGURE 4 is a block diagram and schematic illustration of a two-interval pretimed insert on demand module.

FIGURE 4 shows a module which upon demand will time out two consecutive fixed time periods. The demand portion of this module is similar to that shown in FIGURE 3 while the timing portion is similar to that shown in FIGURE 1. Consequently, the components in FIGURE 4 are numbered the same as the corresponding components in FIGURES 1 and 3. In FIGURE 4 the limiting means 61 is shown as a transistor rather than a Zener diode. The function of transistor 61 is substantially identical to the Zener diode shown in FIGURE 3.

The operation of FIGURE 4 is easily ascertained from an understanding of FIGURES 1 and 3. In FIGURE 4 there is no output terminal corresponding to terminal 73 of FIGURE 3, however, one could easily be supplied if it is so desired.

The module shown in FIGURE 4 is used for the same general functions as the module shown in FIGURE 3, however, the gate 2 load may be used for a clearance interval which is not provided by the module shown in FIGURE 3.

Figure 5:
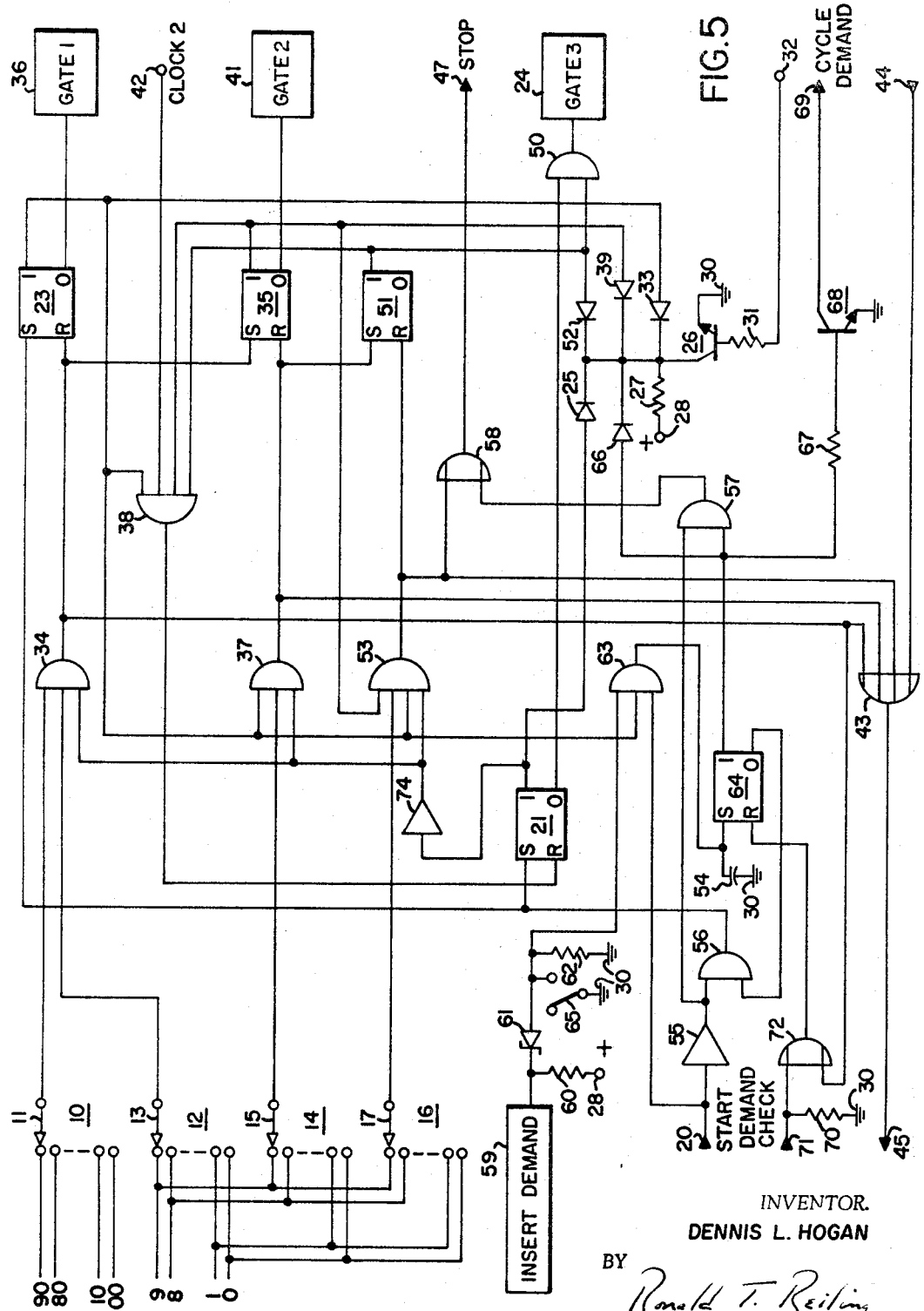
FIGURE 5 is a block diagram and schematic illustration of a three-interval pretimed insert on demand module.

The module shown in FIGURE 5 provides three consecutive timed intervals upon demand. The function of the module shown in FIGURE 5 is basically the same as that shown in FIGURE 4, however, an all red clearance interval is timed out in substantially the same manner as was shown and described in FIGURE 2. Accordingly, the descriptions of FIGURES 2, 3, and 4 completely illustrate the operation of FIGURE 5. The only change is that the 0 output of flip-flop 21 is not connected to AND gates 34, 37 and 53. The 1 output of flip-flop 21 is connected through an inverter 74 to one input on each of AND gates 34, 37 and 53. As the 1 and 0 outputs of a flip-flop are maintained in opposite states, connecting the 1 output of a flip-flop through an inverter is identical to connecting the 0 output directly.

Figure 6:
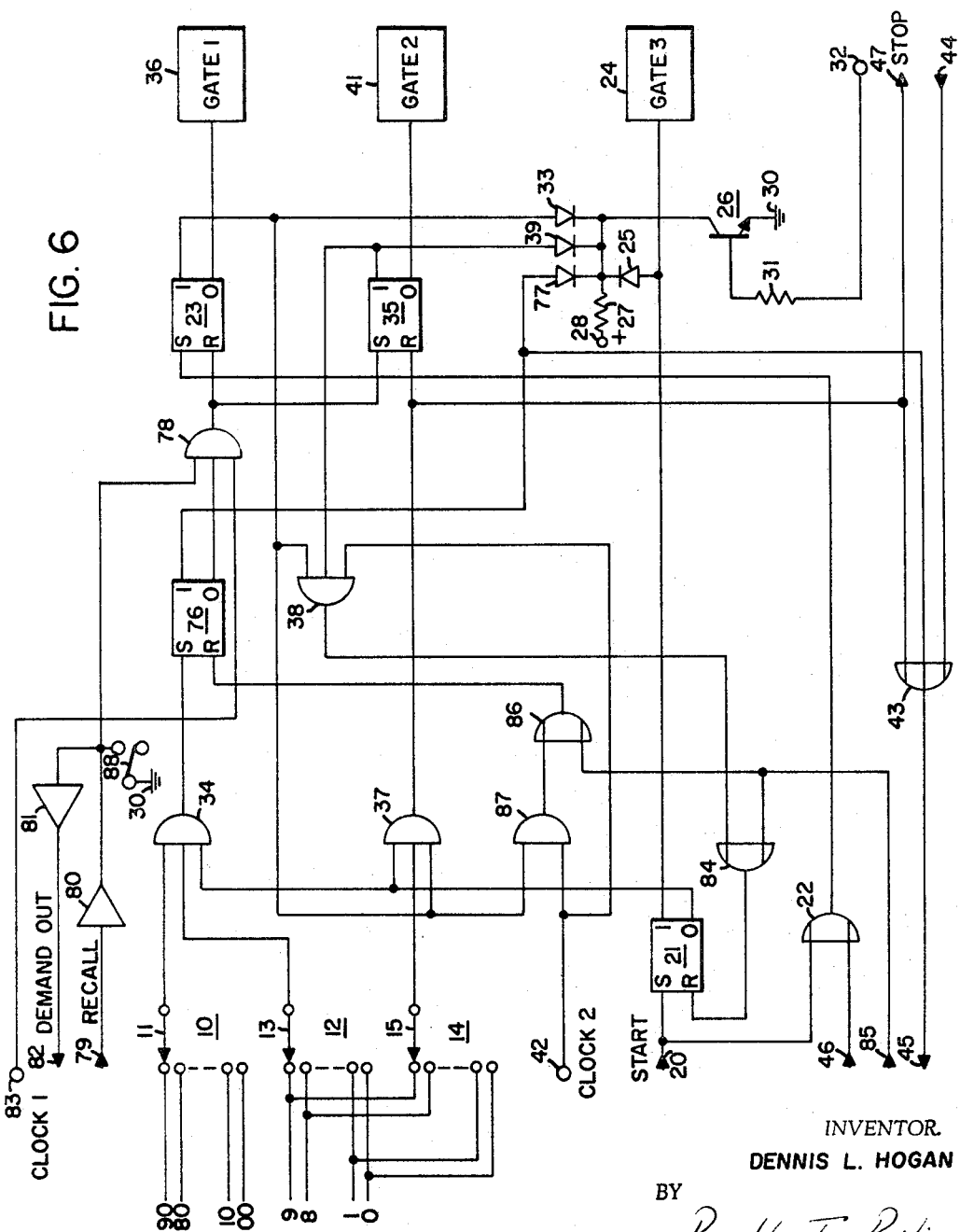
FIGURE 6 is a block diagram and schematic illustration of a two-interval pretimed with recall module.

The module shown in FIGURE 6 is basically the same as that shown in FIGURE 1 and provides the same general functions however a recall portion is added so that this module may be used to control the main arterial traffic movement through a semiactuated intersection. The components in the module shown in FIGURE 6 are generally numbered the same as those shown in FIGURE 1. The output of gate 34 is not connected to the reset input of flip-flop 23, but is connected to the set input of a bistable means, bistable element, or flip-flop 76 which is generally the same as the other flip-flops. The 1 output of flip-flop 76 is connected through a diode 77 to the collector of transistor 26 and is further connected to an input of gate 43 instead of the output from gate 34 being connected to gate 43. The 0 output from flip-flop 76 is connected to a gate means or AND gate 78.

A recall input terminal 79 is connected through a first inverter 80 and a second inverter 81 to an output terminal 82 labeled DEMAND OUT. The junction point between inverters 80 and 81 is connected to a second input of gate 78, a third input of which is connected to an input terminal 83 which is labeled CLOCK 1. Clock 1 provides an input pulse similar to that provided by clock 2. The output of gate 78 is connected to the reset input of flip-flop 23 and is further connected to the set input of flip-flop 35.

The output of gate 38 is connected to one input of a gate means or OR gate 84 the output of which is connected to the reset input of flip-flop 21. An input terminal 85 is connected to a second input terminal of gate 84 and to one input terminal of a gate means or OR gate 86 the output of which is connected to the reset input of flip-flop 76. The clock 2 input terminal 42 is connected to one input of a gate means or AND gate 87 the other input of which is connected to the 1 output of flip-flop 23. The output of gate 87 is connected to a second input of gate 86.

One end of a switch 88 is connected to the junction point between inverters 80 and 81 and the other end of switch 88 is connected to ground 30. Therefore, when switch 88 is closed, the input terminal to gate 78 is grounded. As gate 78 is energized when its input terminals are at ground potential, switch 88 provides an automatic recall feature.

The operation of FIGURE 6 is substantially the same as FIGURE 1 except that the recall circuitry is added. As was mentioned hereinbefore, this module is adapted to be used on the arterial street in a semiactuated intersection. Thus, when a vehicle enters the side street and actuates a detector, a recall demand is made. A pulse at recall input 79 is transmitted through inverter 80 to the input of gate 78. The recall pulse is also transmitted through inverter 81 to the demand out terminal 82.

The module shown in FIGURE 6 also contains a minimum green provision so that the right-of-way signal must be displayed on the arterial street for a minimum length of time. Thus, when a start pulse sets flip-flops 21 and 23 thereby energizing block 36 to display the right-of-way signal, the 0 output of flip-flop 21 energizes one terminal of AND gate 34. If a demand is made for a cross street right-of-way before the counter energizes contacts 11 and 13, the input signal at terminal 79 cannot energize gate 78 because flip-flop 76 is reset. After the counter cycles until contacts 11 and 13 are energized thereby energizing gate 34 and setting flip-flop 76, AND gate 78 is energized. Now any demand made for a recall energizes AND gate 78 to reset flip-flop 23 and set flip-flop 35 thereby displaying a clearance signal on the arterial street. The operation of the timing portion of FIGURE 6 then follows from FIGURE 1.

When flip-flop 23 is reset, the 1 output of flip-flop 23 and the clock 2 input at terminal 42 energize AND gate 87 which provides an output signal through OR gate 86 to reset flip-flop 76. When both of flip-flops 23 and 35 are reset, AND gate 38 provides an output pulse which passes through OR gate 84 to reset flip-flop 21.

Input terminal 46 provides the same function as hereinbefore described. A pulse applied to terminal 46 passes through OR gate 22 and sets flip-flop 23 thereby providing a right-of-way signal. This input may be used, if desired, to provide a right-of-way signal when a nonconflicting movement also has a right-of-way signal. An example would be in an intersection where there is a pedestrian actuator and a pedestrian walk signal is displayed parallel to the movement controlled by the module of FIGURE 6.

Input terminal 85 may or may not be used as is desired. If terminal 85 is used, it is connected to a pedestrian module, which will be explained in FIGURE 8. A signal applied to terminal 85 will reset both of flip-flops 21 and 76 thereby assuring a red light on the arterial street.

Figure 7:
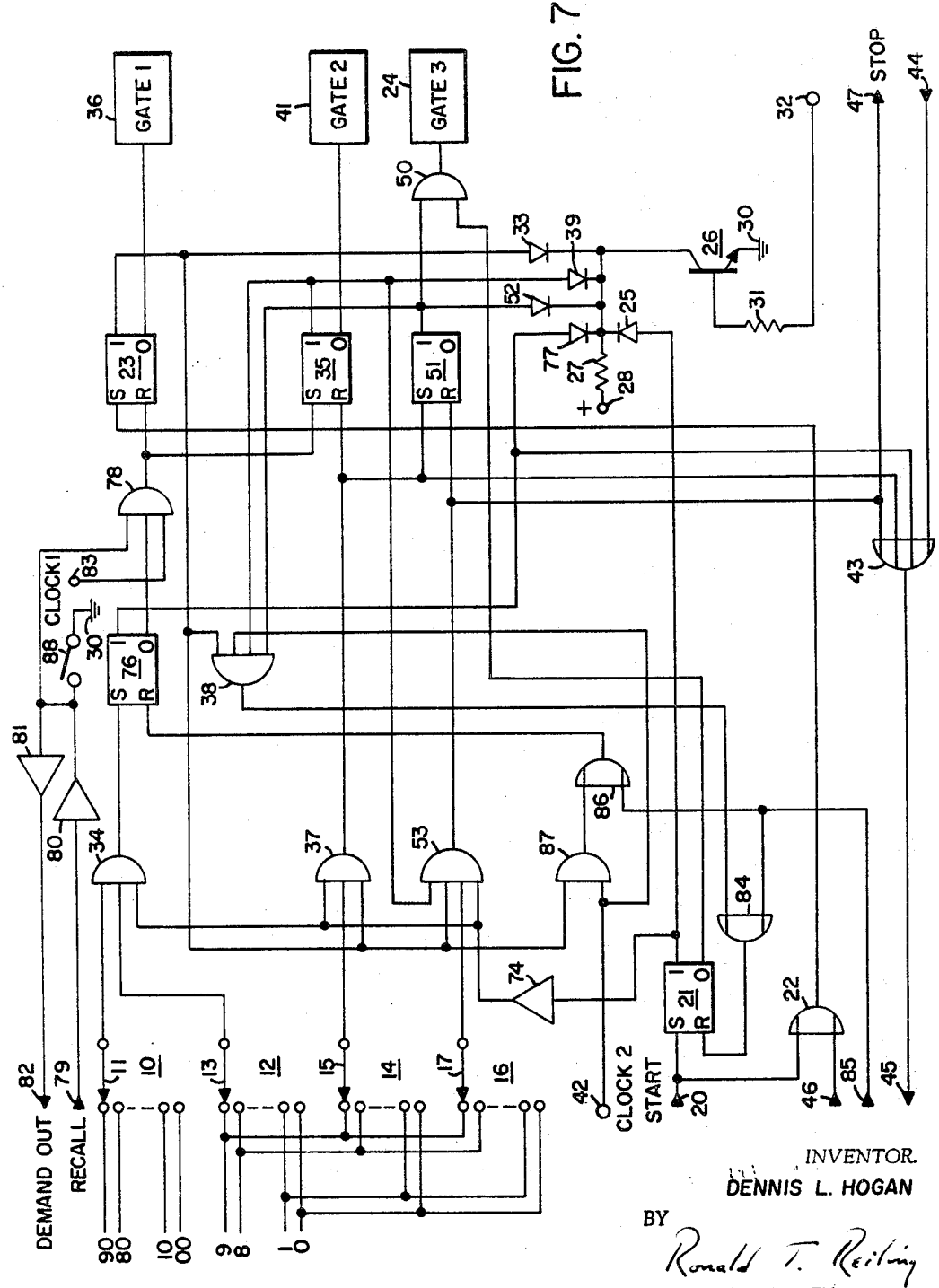
FIGURE 7 is a block diagram and schematic illustration of a three-interval pretimed with recall module.

FIGURE 7 shows a three-interval pretimed module similar to that shown in FIGURE 2 with the recall feature similar to that shown in FIGURE 6. Accordingly the explanation of FIGURE 2 combined with the explanation of FIGURE 6 fully illustrates the operation of FIGURE 7. The numbers shown on FIGURE 7 correspond to those shown on FIGURES 2 and 6. The module shown in FIGURE 7 provides an all red clearance interval for large intersections in addition to the functions provided by the module shown in FIGURE 6.

Figure 8:
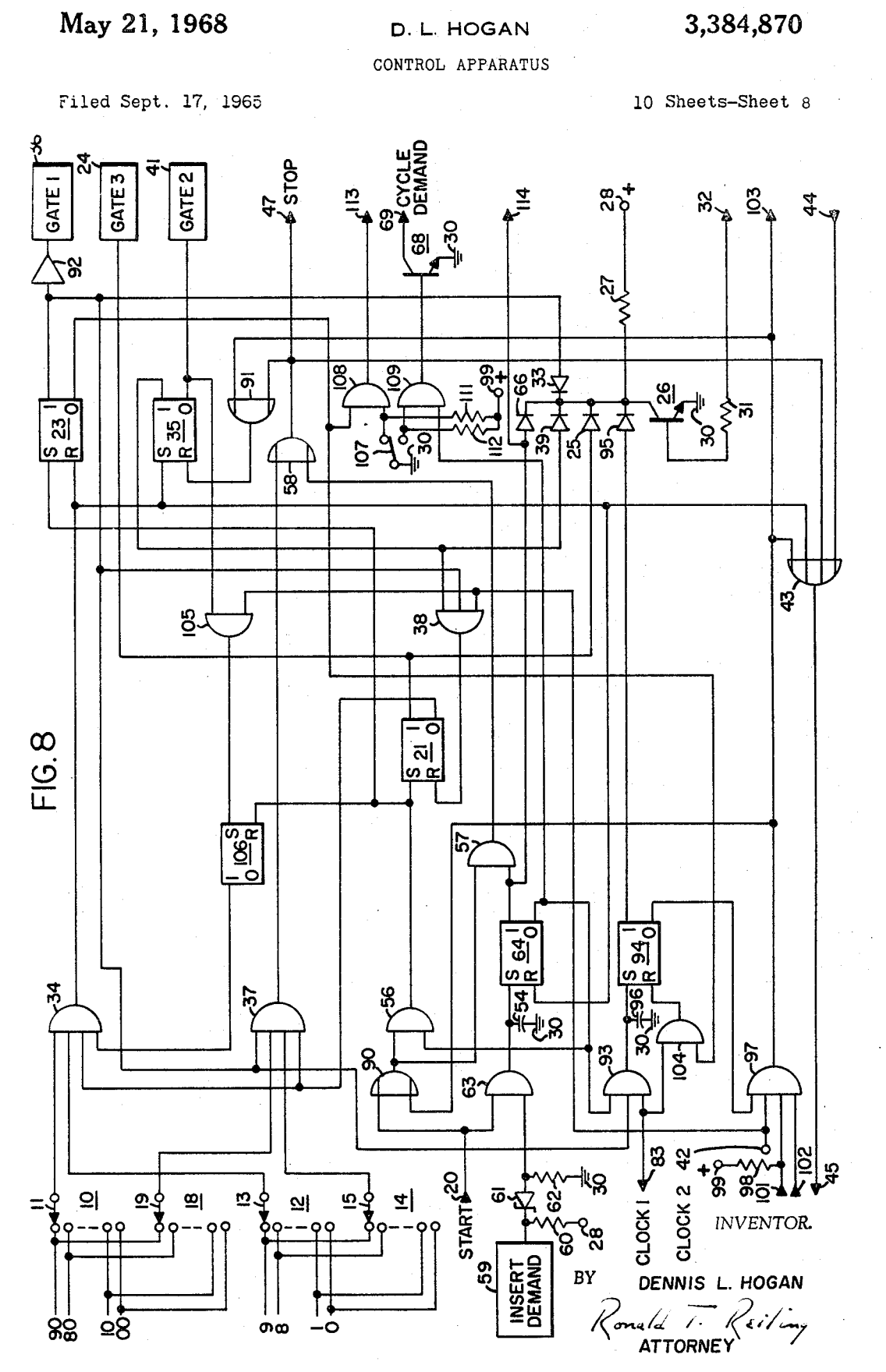

FIGURE 8 shows a module similar to the module shown in FIGURE 4, however, the module shown in FIGURE 8 is specifically adapted for use as a pedestrian module in which a pedestrian walk signal is provided upon demand. Of course, if it is desired to insert a pedestrian walk signal in every cycle in a fixed time intersection, one of the above-described modules may be inserted in parallel with the main movement controller. As the module shown in FIGURE 8 is similar to the module shown in FIGURE 4, many of the same numbers have been used.

In FIGURE 8 a switch 18 with a variable contact 19 is inserted in parallel with switch 10. Contact 19 is connected to a fourth input on gate 37 whereby the pedestrian clearance interval may be varied between 0 and 99 seconds. A gate means or OR gate 90 replaces inverter 55 of FIGURE 4. The output of gate 37 is not directly connected to the reset input of flip-flop 35; however, the output from gate 58 is connected through a gate means or OR gate 91 to the reset input of flip-flop 35. The 0 output of flip-flop 23 is not connected to block 36, however, the 1 output is connected through an inverter 92 to provide energization of block 36.

The 0 output of flip-flop 64 is connected to one input of a gate means or AND gate 93 the second input of which is connected to terminal 83 which is clock 1. The 1 output of flip-flop 23 is connected to a third terminal of gate 93 rather than to gate 63. The output of gate 93 is connected to a set input of a bistable means, bistable element, or flip-flop 94 which is similar to flip-flop 21. The 1 output of flip-flop 94 is connected through a diode 95 to the collector of transistor 26. The set input of flip-flop 94 is connected through a capacitor 96 to ground 30. The 0 output of flip-flop 94 is connected to one input of a gate means or AND gate 97, a second input of which is connected to terminal 42. A third input of gate 97 is connected through a resistor 98 to a positive source of energizing potential 99 and further to an input terminal 101. A fourth input of gate 97 is connected to an input terminal 102, and the output is connected to a second input terminal of gate 90, a fourth input terminal of gate 43, a second input terminal of gate 91, and an output terminal 103.

The 0 output of flip-flop 23 is connected to a gate means or AND gate 104 which has a second input connected to input terminal 83 and an output connected to the reset input of flip-flop 94. The 0 output of flip-flop 35 is connected to one input of a gate means or AND gate 105 which has a second input terminal connected to input terminal 42 and an output terminal connected to the set input of a bistable means, bistable element, or flip-flop 106. The 1 output of flip-flop 106 is connected to a fourth input terminal of AND gate 34 and the reset input of flip-flop 106 is connected to the output of gate 56.

One side of a switch 107 is connected to ground 30 and the other side of switch 107 is connected to a first input of a gate means or AND gate 108 or a first input of a gate means or AND gate 109. The input to gate 108 is connected through a resistor 111 to the positive source 99 and the input of gate 109 is connected through a resistor 112 to source 99. A second input to gate 108 is connected to the 0 output of flip-flop 23 and a second input of gate 109 is connected to the 0 output of flip-flop 64. An output of gate 108 is connected to an output terminal 113 and an output of gate 109 is connected to transistor 68 instead of flip-flop 64 being connected to transistor 68.

To understand the operation of FIGURE 8, assume that all of the flip-flops are reset and there is no pedestrian demand from insert demand 59. If a start pulse occurs, it is passed through OR gate 90, AND gate 57, and OR gate 58 to the stop output terminal 47 thereby skipping this module.

When a pedestrian pushes a button actuating the insert demand 59, gate 63 provides a signal to set flip-flop 64. The signal from flip-flop 64 energizes gate 93 to set flip-flop 94.

The 1 output of flip-flop 64 is connected to an output terminal 114. This module is adapted to be used or inserted in the traffic cycle just prior to a module controlling the parallel traffic movement. If switch 107 is connected to the input of gate 108 such that gate 108 is energized, terminal 114 will be connected to the following module which controls the parallel traffic movement and will signal the following module that a demand has been made. This portion of FIGURE 8 is particularly adapted to be used with FIGURE 9 and will be explained more fully in connection with FIGURE 9. A signal at output terminal 114 will recall the right-of-way signal from any dwell and will provide a start pulse at terminal 29. This start pulse will set flip-flops 21 and 23 whereby walk and wait signals are timed out. The only difference is that it is preferred that block 41 provide a flashing don't walk pedestrian clearance signal. This flashing signal is timed and at the end of the flashing interval, a steady don't walk signal occurs due to block 24.

It is conceivable that the don't walk clearance interval may be longer than the walk interval so that when the counter cycles, contacts 11 and 13 are re-energized during the wait time. Therefore, gate 105 and flip-flop 106 are provided to inhibit gate 34 during the wait cycle when block 41 is energized.

When switch 107 is connected to the input of gate 108, gate 108 is energized by flip-flop 23 during the walk time. Thus, a signal is provided at terminal 113 which will set a green or right-of-way signal on the parallel vehicular traffic movement. This is termed the shared condition whereby the walk signal and green signal are shared by two movements simultaneously. The stop output terminal 47 must be connected to the start input terminal of the parallel vehicular traffic controller module so that a clearance interval is timed out for vehicles.

If switch 107 is connected to the input of gate 109, output terminal 114 is not used and when flip-flop 64 is set, a cycle demand signal is provided at output terminal 69. This is termed the exclusive position and the right-of-way signal is not displayed for a parallel movement.

Assume that switch 107 is connected to the input of gate 108. When a demand is made to recall the right-of-way signal to this module and a prior demand has been made by a conflicting traffic movement, it is desired that the conflicting traffic movement demand be satisfied first. Accordingly, terminal 101 is connected to receive the demand signal from a prior movement and inhibits gate 97 until the prior demand is satisfied. Similarly, if a demand is made for a pedestrian cycle while the module controlling the parallel traffic movement is displaying a green light, a signal will appear at terminal 102 to energize gate 97. Thus, if there is no prior demand from a conflicting movement and a nonconflicting movement has the right-of-way signal, gate 97 is energized and provides a signal to gate 90 to start the timing function the same as a start pulse would.

The output pulse from gate 97 will also reset flip-flop 35 if flip-flop 35 should happen to be set when a demand is made. Output terminal 103 is connected to a terminal similar to terminal 85 of FIGURES 6, 7 and 9. This output assures that a conflicting movement will not be given the right-of-way signal simultaneously with a walk signal.

When gate 34 provides an output signal indicating the end of the walk time, the output signal from gate 34 resets flip-flop 64. The output signal from flip-flop 23, when flip-flop 23 is reset, resets flip-flop 94.

Figure 9:
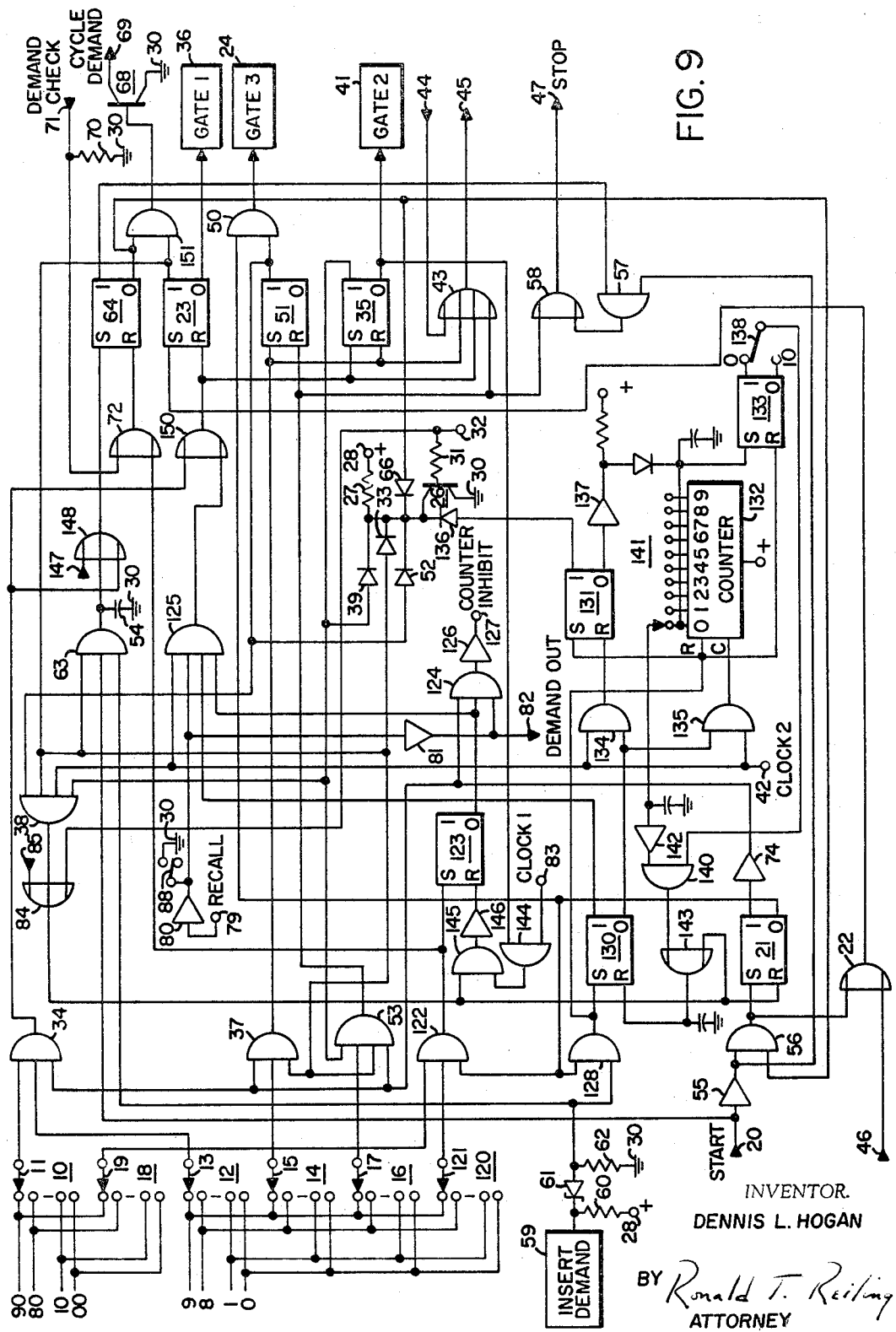
FIGURE 9 is a block diagram and schematic illustration of an actuator module.

FIGURE 9 shows a module that combines most of the features of the previous modules and is particularly adapted to be used in a semi-actuated or fully actuated intersection. This module contains provisions for timing a minimum green interval upon actuation, a unit extension interval upon reactuation, a maximum green interval after which no more unit extensions can be given, a yellow or clearance interval, and an all red or additional clearance interval. This module contains many of the same components as were contained in all of the previous modules. Accordingly, many of the same numbers have been used as were used in the previous modules.

A switch 120 with a variable contact 121 is added in parallel with switch 12. Contact 19 and switch 18 and contact 121 of switch 120 are connected to first and second inputs of a gate means or AND gate 122 a third input of which is connected to the 0 output of flip-flop 21. The output of gate 122 is connected to a set input of a bistable means, bistable element, or flip-flop 123 which is similar to the previous flip-flops described herein. The 0 output of flip-flop 123 is connected to a first input of a gate means or AND gate 124 and to the start input of a gate means or AND gate 125. The output of inverter 81 is connected to a second input to gate 124 and a third input to gate 124 is connected to the output of inverter 74. The output of gate 124 is connected through an inverter 126 to an output terminal 127 labeled COUNTER INHIBIT.

The output of limiting device 61 is connected to one input of a gate means or AND gate 128 a second input of which is connected to the 0 output of flip-flop 21. The output of gate 128 is connected to the set input of a bistable means, bistable element or flip-flop 130; to the set input of a bistable means, bistable element, or flip-flop 131; to a reset input of a timing means or counter 132; and to the reset input of a bistable means, bistable element, or flip-flop 133. The 1 output of flip-flop 130 is connected to an input of gate 125 and the 0 output is connected to one input of gate means or AND gates 134 and 135. A second input of each of gates 134 and 135 is connected to terminal 42 which provides clock pulses thereto. The output terminal of gate 135 is connected to a count input C of counter 132 and the output of gate 134 is connected to the reset input of flip-flop 131. The 1 output of flip-flop 131 is connected through a diode 136 to the collector of transistor 26. The 0 output of flip-flop 131 is connected through an inverter 137 to the set input of flip-flop 133. The set input of flip-flop 133 is also connected to an output of counter 132.

A switch 138 may be connected to either the 1 or 0 output of flip-flop 133 thereby connecting the output of flip-flop 133 to one input of a gate means or AND gate 140. Counter 132 has a plurality of outputs and a variable contact switch 141 adapted to be connected to one of a plurality of outputs. The output of switch 141 is connected through an inverter 142 to a second input of gate 140 the output of which is connected through a gate means or OR gate 143 to the reset input of flip-flop 130. A third input of gate 125 is connected to the junction point between inverters 80 and 81 and a fourth input is connected to input terminal 42.

The 0 output of flip-flop 35 is connected to one input of a gate means or AND gate 144 the other input of which is connected to input terminal 83 and the output of which is connected to one input terminal of a gate means 145. A second input of gate means 145 is connected to the output of gate 84 and the output of gate 145 is connected through an inverter 146 to the reset input of flip-flop 123. An input terminal 147 which is adapted to be connected to output terminal 114 of FIGURE 8 is connected to one input of a gate means or OR gate 148 a second input of which is connected to the output of gate 63 and a third input of which is connected to the output of gate 34. The output of gate 148 is connected to the set input of flip-flop 64. The output of gate 34 is connected through a gate means or OR gate 150 to the reset input of flip-flop 23 and the set input of flip-flop 35. A second input of gate 150 is connected to the output of gate 125. The 0 output of flip-flop 64 and the 1 output of flip-flop 23 are connected to first and second inputs of a gate means or AND gate 151 the output of which is connected to the base of transistor 68. The 0 output of flip-flop 64 is connected to diode 66 rather than the 1 output so that when the controller is reset an automatic demand will be placed for recall of the right-of-way signal to this module.

To understand the operation of FIGURE 9, first assume that all of the flip-flops are reset, that switch 88 is connected to ground 30, and that there is no demand on the insert demand 59. If a start pulse should occur, it will pass through inverter 55, gate 57, and gate 58 to the stop output terminal 47. If, for example, a vehicle should actuate a detector thereby supplying a signal from insert demand 59, all three terminals of gate 63 will be energized thereby setting flip-flop 64. The 0 output of flip-flop 64 and the 1 output of flip-flop 23 will energize gate 151 to supply a signal on the cycle demand 69. This signal will signify that a demand has been made for a recall and is typically coupled to the recall input of another module controlling another movement. Thus, when a start pulse occurs, flip-flop 21 will be set thereby energizing gates 122, 34, 37, and 53 to time out four fixed time intervals. Switches 18 and 120 are set to provide a minimum green interval after which, if there is no further actuation of the detector, a clearance interval and an all red interval will be provided.

However, if subsequently a second demand is made by insert demand 59, gate 128 will be energized thereby setting flip-flops 130 and 131 and resetting counter 132 and flip-flop 133.

The minimum green output signal from gate 122 is inhibited by gate 125 because flip-flop 130 is set. When minimum green times out so that gate 122 provides an output pulse, flip-flop 123 will be set and flip-flop 64 will be reset. As flip-flop 23 is set, gate 63 cannot be re-energized and flip-flop 64 will remain reset.

When flip-flop 130 is set, gates 134 and 135 are energized and pulses are supplied from the clock 2 input terminal 42 to the counter 132. The first pulse from gate 134 resets flip-flop 131. Flip-flop 131 is provided to prevent the counter 132 from setting flip-flop 133 before counter 132 is reset.

Counter 132 counts pulses applied at its count input terminal C and is arranged such that is counts down from a maximum setting. Counter 132 may be a ring counter. The output signal is taken from counter 132 by switch 141 and is variable between 0 and 19 seconds. If switch 138 is set in its 0 position, the first time that the switch contact of switch 141 is energized, AND gate 140 provides an output pulse. However, if switch 138 is set in the 10 position, counter 132 cycles once to set flip-flop 133 thereby energizing gate 140 from switch 138 and the second time through counter 132 energizes switch 141. The output pulse from gate 140 resets flip-flop 130 whereby gate 125 is energized to reset flip-flop 23 and set flip-flop 35 once a pulse from gate 122 sets flip-flop 123. The clearance and all red intervals are timed out in a manner described hereinbefore.

Subsequent actuations of the insert demand 59 will continue timing out green extensions until a maximum green time has been timed. Switches 10 and 12 are set to this maximum green time and energize gate 34. The output from gate 34 resets flip-flop 23 and sets flip-flop 35 whether or not there is a demand for green extensions. However, the maximum green output from gate 34 also sets flip-flop 64 so that the module remembers that there is a demand and returns to this module on the next cycle. This maximum green time is provided so that continuous actuation of the insert demand 59 will not provide a constant right-of-way signal for an indefinite time period.

This module may also be used in a fully actuated intersection in which case recall 79 is used. In this case switch 88 is opened so that inverter 81 energizes gate 124 unless a signal is present at terminal 79. When the module shown in FIGURE 9 receives a right-of-way signal and there is no demand on a conflicting movement, there is no need to transfer the right-of-way signal to another movement. Accordingly, after minimum green has been timed and flip-flop 123 is set, gate 124 is energized thereby providing a signal at output terminal 127. This signal inhibits the counter so that the movement controlled by the module shown in FIGURE 9 receives a right-of-way signal continuously. When a demand is made on a conflicting movement, input terminal 79 will be energized thereby inhibiting gate 124 and permitting the counter to begin cycling again so that a clearance and all red intervals are timed out. Thus, the right-of-way signal is not transferred to another movement until there is a demand.

When the module shown in FIGURE 9 is used in conjunction with the pedestrian module shown in FIGURE 8, and the pedestrian module is in the shared condition, terminals 46, 85, and 147 are connected to appropriate output terminals of the pedestrian module. When a demand is made for a pedestrian actuation, a pulse occurs at terminal 147 which sets flip-flop 64 to provide an output signal at the cycle demand output terminal 69. Thus, the right-of-way signal is recalled and the pedestrian module receives a start input signal at input terminal 20. A signal is also provided at terminal 85 which holds flip-flops 123 and 21 reset so that this module cannot time out its functions. This module is held inactive because the pedestrian walk signal may be set for a longer time period than minimum green on this module. Accordingly, it is desired not to transfer the right-of-way signal to any other movement until the guaranteed pedestrian walk and wait times have been timed out. However, as it is desired to share the green light with the walk signal, an input signal occurs at input terminal 46 to set flip-flop 23 so that a green light is provided on the parallel movement. Once the pedestrian module has finished timing, a start pulse occurs at input terminal 20 to time out the module shown in FIGURE 9.

Form the above descriptions of the various figures, it is seen that each module has a particular function and each module may be used with any of the other modules to provide a wide variety of intersection controllers. Each of the modules may be placed on a similar circuit board so that they are completely interchangeable and may be placed in a cabinet in any sequence.

Figure 10:
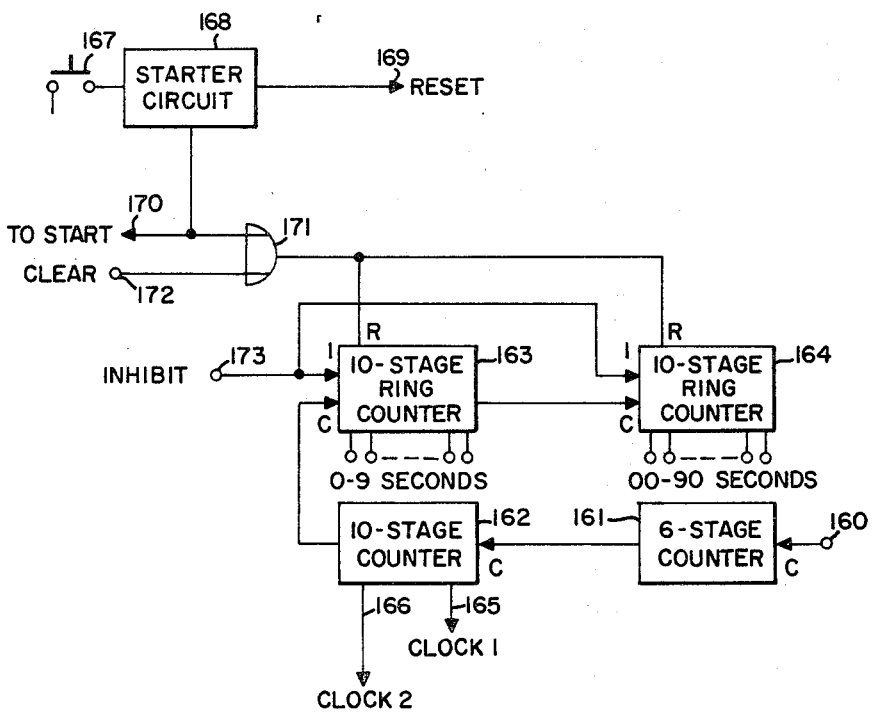
FIGURE 10 is a block diagram and schematic illustration of a centrally located clock and interconnect circuitry.

FIGURE 10 shows a module which may be used for timing and providing the signals to switches 10, 12, 14, 16, 18, and 120. An input terminal 160 is connected to the input of a six-stage counter 161 the output of which is connected to a ten-stage counter 162. Input terminal 160 may be connected to an alternating potential source and in the embodiment shown herein input terminal 160 is connected to a 60-cycle source which may be the normal line voltage. The output of counter 162 is connected to a ten-stage ring counter 163. If terminal 160 is connected to a 60-cycle source, the output pulses from counter 162 occur 1 per second. Thus, ring counter 163 provides 10 sequential pulses each of 1 second duration. Each time counter 163 recycles, a pulse is applied to a ten-stage ring counter 164 so that counter 164 provides 10 sequential pulses each of 10 seconds duration.

Counter 162 also provides output pulses to terminals 165 and 166 which may be used as clock 1 and clock 2 respectively. A switch 167 is connected to the input of a starter circuit 168 which has a first output connected to a reset output terminal 169 and a second output connected to a start terminal 170. The second output of starter circuit 168 is connected to one input of an OR gate 171 the output of which is connected to a reset input of each of counters 163 and 164. Thus, when switch 167 is closed, starter circuit 168 provides output signals at output terminals 169 and 170. Output terminal 169 is connected to a terminal such as terminal 32 of the previously described modules thereby resetting the flip-flops in each of the modules. The signal at terminal 170 is applied to the start terminal of the first module to be timed out. Starter circuit 168 also resets counters 163 and 164.

A second input of gate 171 is connected to a clear terminal 172 which is adapted to be connected to terminal 45 of the previously described modules. A pulse applied to terminal 172 resets counters 163 and 164.

An inhibit input terminal 173 is connected to an inhibit input on each of counters 163 and 164. Terminal 173 is adapted to be connected to a terminal such as 127 of FIGURE 9 whereby a signal applied at terminal 173 inhibits counters 163 and 164 but does not destroy the count.

While I have shown and described specific embodiments of my invention it is to be understood that various modifications will be obvious to those skilled in the art. Accordingly, I do not wish to be limited to the specific embodiments shown and described herein but only by the scope of the appended claims.

I claim as my invention:

1. Apparatus of the class described comprising, in combination:

first and second bistable means each having first and second output means and input means for reversing the state thereof;

means for providing an input signal connected to the input means of said first and second bistable means whereby said input signal is operable to switch each of said bistable means to a first stable state;

first and second load means;

means connecting said first load means to said output means of said first bistable means whereby said first load means is unenergized when said first bistable means is in the first state;

means connecting said second load means to said output means of said second bistable means whereby said second load means is energized when said second bistable means is in the first state;

gate means connected to said output means of said first bistable means, said gate means being energized when said first bistable means is in the first state;

counter means for providing a plurality of output signals sequentially spaced in time;

multiposition switch means connected to said counter means;

means connecting said switch means to said gate means whereby said gate means receives a signal from said switch means when said counter means reaches a predetermined count, said gate means providing an output signal upon coincidence of signals from said first bistable means and said switch means;

means connecting said gate means to said input means of said second bistable means whereby the output signal from said gate means switches said second bistable means to a second state;

means connecting said output means of said second bistable means to said input means of said first bistable means whereby signals indicative of said second bistable means being in the second state switch said first bistable means to the second state; and means connected to said gate means for providing an output signal indicative of the completion of a cycle of operation.

2. In a traffic controller module for providing timing intervals comprising, in combination:

a first bistable element;

an input means for providing a start signal;

means connecting said input means to said first bistable element, whereby the start signal switches said first bistable element to an ON state;

gate means;

means connecting said gate means to said first bistable element, said gate means being energized when said bistable element is in the ON state;

timing means including a counter and a multiposition switch connected thereto, said switch providing an output signal after a predetermined count is reached by said counter, said count being indicative of the length of time a given signal is to be provided;

a second bistable element;

means connecting said second bistable element to said input means whereby the start signal switches said second bistable element to an ON state;

means connecting said gate means to said timing means and to said second bistable element whereby said second bistable element is switched to an OFF state by a signal from said gate means after said timing means provides a signal coincident with the ON signal from said first bistable means;

means connecting said second bistable element to said first bistable element whereby said first bistable element is switched OFF after said second bistable element is switched OFF;

means connecting said second bistable means to a right-of-way signal whereby said right-of-way signal is provided when said second bistable element is ON;

means connecting a signal load to said first bistable element whereby said signal load is energized when said first bistable element is OFF; and output means connected to the controller for providing a signal indicative of the end of the timing intervals.

3. In a traffic controller module as defined in claim 2:

a third bistable element;

means connecting said third bistable element to said gate means whereby said third bistable element switches ON when said second bistable element switches OFF;

means connecting said third bistable element to a clearance signal whereby said clearance signal is energized when said third bistable element is ON;

a second gate means;

means connecting said second gate means to said first and second bistable elements;

means connecting said counter to receive a signal indicative of said second bistable element being switched OFF, the signal resetting said counter;

a second multi-position switch;

means connecting said second switch to said counter and to said second gate means whereby said second gate means provides an output signal when said counter reaches a predetermined count, said first bistable element is ON, and said second bistable element is OFF;

means connecting said second gate means to said third bistable element whereby said third bistable element switches OFF in response to the output signal from said second gate means; and wherein said means connecting said second bistable element to said first bistable element includes means connecting said third bistable element to said first bistable element whereby said first bistable element is switched OFF after said second bistable element is switched OFF.

4. In a traffic controller module as defined in claim 3:

a fourth bistable element;

means connecting said fourth bistable element to said second gate means whereby said fourth bistable element switches ON when said third bistable element switches OFF;

means connecting said fourth bistable element to said signal load whereby said signal load is energized when said fourth bistable element is ON;

a third gate means;

means connecting said third gate means to said first and third bistable elements;

means connecting said counter to receive a signal indicative of said third bistable element being switched OFF, the signal resetting said counter;

a third multi-position switch;

means connecting said third switch to said counter and to said third gate means whereby said third gate means provides an output signal when said counter reaches a predetermined count, said first bistable element is ON, and said third bistable element is OFF;

means connecting said third gate means to said fourth bistable element whereby said fourth bistable element switches OFF in response to the output signal from said third gate means; and wherein said means connecting said second bistable element to said first bistable element includes means connecting said fourth bistable element to said first bistable element whereby said first bistable element is switched OFF when said fourth bistable element is switched OFF.

5. In a traffic controller module as defined in claim 3, wherein said means connecting said first-named gate means to said second bistable element includes recall means, the module providing the right-of-way signal until a signal from said recall means occurs, and delay means whereby the signal from said recall means is prevented from recalling the module before a predetermined time delay after the right-of-way signal is displayed.

6. In a traffic controller module as defined in claim 5, wherein said delay means includes a bistable element and a gate means connected thereto, said last-named bistable element being OFF until the signal from said first-named gate means switches said last-named bistable element ON, and said last-named gate means providing a signal to switch said second bistable element OFF upon coincidence of a signal indicative of said last-named bistable element being ON and a signal from said recall means.

7. In a traffic controller module as defined in claim 4, wherein said means connecting said first-named gate means to said second bistable element includes recall means, said second bistable element remaining ON until a signal from said recall means occurs, and delay means whereby the signal from said recall means is prevented from recalling the right-of-way signal before a predetermined time delay after said second bistable means is switched ON.

8. In a traffic controller module as defined in claim 7, wherein said delay means includes a bistable element and a gate means connected thereto, said last-named bistable element being OFF until the signal from said first-named gate means switches said last-named bistable element ON, and said last-named gate means providing a signal to switch said second bistable element OFF upon coincidence of a signal indicative of said last-named bistable element being ON and a signal from said recall means.

9. In a traffic controller module as defined in claim 2, wherein said means connecting said input means to said first and second bistable elements includes a second gate means;
   means including third gate means connecting said input means to said output means;
   a third bistable element normally maintained in an OFF state;
   means connecting said third bistable element to said third gate means whereby said third gate means provides an output signal to said output means upon coincidence of a signal from said input means and a signal from said third bistable element indicative of said third bistable element being OFF;
   demand means connected to said third bistable element whereby signals from said demand means switch said third bistable element ON;
   means connecting said third bistable element to said second gate means whereby said second gate means provides an output signal to said first and second bistable elements upon coincidence of the input signal and a signal from said third bistable element indicative of said third bistable element being ON; and
   means connecting said first named gate means to said third bistable element whereby signals from said first-named gate means switch said third bistable element OFF.

10. In a traffic controller module as defined in claim 3, wherein said means connecting said input means to said first and second bistable elements includes:
   a fourth bistable element;
   third gate means;
   means connecting said input means and said fourth bistable element to said third gate means whereby said third gate means provides an output signal when the input signal is applied thereto and said fourth bistable element is OFF;
   demand means connected to said fourth bistable element whereby signals from said demand means switch said fourth bistable element ON;
   fourth gate means connected between said input means and said first and second bistable elements; and
   means connecting said fourth bistable element to said fourth gate means whereby the start signal is transmitted through said fourth gate means to said first and second bistable elements when said fourth bistable element is ON.

11. In a traffic controller module as defined in claim 4, wherein said means connecting said input means to said first and second bistable element includes:
   a fifth bistable element;
   fourth gate means;
   means connecting said input means and said fifth bistable element to said fourth gate means whereby said fourth gate means provides an output signal when the input signal is applied thereto and said fifth bistable element is OFF;
   demand means connected to said fifth bistable element whereby signals from said demand means switch said fifth bistable element ON;
   fifth gate means connected between said input means and said first and second bistable elements; and
   means connecting said fifth bistable element to said fifth gate means whereby the start signal is transmitted through said fifth gate means to said first and second bistable elements when said fifth bistable element is ON.

12. In a traffic controller module as defined in claim 10:
   means connected to said fourth bistable element for providing a signal to said fourth bistable element whereby the last-named signal switches said fourth bistable element OFF when the signal from said demand means ends prior to the start signal; and
   means connecting said fourth bistable element to an opposing traffic movement controller module whereby the right-of-way signal is recalled when said fourth bistable element is ON.

13. In a traffic controller module as defined in claim 11:
   means connected to said fifth bistable element for providing a signal to said fifth bistable element whereby the last-named signal switches said fifth bistable element OFF when the signal from said demand means ends prior to the start signal; and
   means connecting said fifth bistable element to an opposing traffic movement controller module whereby the right-of-way signal is recalled when said fifth bistable element is ON.

14. A traffic controller module comprising, in combination:
   a first bistable element;
   an input means for supplying a start signal;
   a second bistable element;
   means connecting said input means to said first and second bistable elements whereby said start signal switches said first and second bistable elements to a first state;
   load means connected to said second bistable element, said load means being energized when said first bistable element is in said first state;
   counter means for supplying a first plurality of sequential signals of a first predetermined time period and a second plurality of sequential signals of a second predetermined time period;
   variable position switch means connected to receive one of said first and one of said second signals from said counter means;
   gate means connected to receive the signals from said switch means and a signal from said first bistable element and to provide an output signal upon coincidence of said one of said first plurality of signals, said one of said second plurality of signals, and the signal from said first bistable element; and
   means connecting said gate means to said second bistable element whereby said second bistable element is switched to a second state by the output signal from said gate means thereby unenergizing said load means.

References Cited
UNITED STATES PATENTS
3,274,547   9/1966   Bolton _____ 340—37

THOMAS B. HABECKER, *Primary Examiner.*